United States Patent [19]
Kuma et al.

[11] Patent Number: 4,886,769
[45] Date of Patent: Dec. 12, 1989

[54] ACTIVE GAS ADSORBING ELEMENT AND METHOD OF MANUFACTURING

[75] Inventors: Tosimi Kuma; Hiroshi Okano, both of Fukuoka, Japan

[73] Assignee: Kabushiki Kaisha Seibu Giken, Fukuoka, Japan

[21] Appl. No.: 205,274

[22] Filed: Jun. 10, 1988

[30] Foreign Application Priority Data

Jun. 10, 1987 [JP] Japan .................................. 62-145873

[51] Int. Cl.$^4$ ............................................. B01J 29/04
[52] U.S. Cl. ........................................ 502/62; 502/70; 502/527; 156/208
[58] Field of Search ............................ 502/62, 70, 527; 156/208

[56] References Cited

U.S. PATENT DOCUMENTS

| | | |
|---|---|---|
| 2,882,243 | 4/1959 | Milton . |
| 2,882,244 | 4/1959 | Milton . |
| 3,091,550 | 5/1963 | Doying ................................. 502/62 |
| 3,219,590 | 11/1965 | Ribaud ................................. 502/62 |
| 3,773,690 | 11/1973 | Heinze et al. ....................... 502/70 |
| 3,795,631 | 3/1974 | Heinze et al. ....................... 502/70 |
| 4,416,800 | 11/1983 | Abe et al. ........................... 502/527 |
| 4,608,361 | 8/1986 | Kanamori et al. ................. 502/527 |
| 4,692,423 | 9/1987 | Caesar ................................. 502/62 |

Primary Examiner—Carl F. Dees
Attorney, Agent, or Firm—Staas & Halsey

[57] ABSTRACT

An element for adsorbing one or more active gases in an inert gas to obtain an inert gas such as air containing an inert gas such as air containing an ultra-low concentration active gas such as water vapor. The element is produced by laminating low density papers composed of inorganic fiber to form a matrix in the form of a gas adsorbing element having numerous small channels penetrating through opposite surfaces, impregnating the matrix with water glass in which synthesized zeolite powder is dispersed, and soaking the matrix in aqueous solution of aluminum salts, magnesium salts or calcium salts, and so on, to form metal silicate hydrogel on the paper and in the apertures between fibers of papers, and washing and drying the matrix and the metal silicate hydrogel to obtain the element. The main constituent of the element being synthesized zeolite and metal silicate aerogel deposited on the inorganic fiber matrix.

11 Claims, 6 Drawing Sheets

ACTIVE GAS ADSORBING ELEMENT AND METHOD OF MANUFACTURING

Cross Reference to U.S. application having Ser. No. 852,291 filed Apr. 15, 1986 (abandoned) and partially assigned to Kabushiki Kasha Seibu Giken.

BACKGROUND OF THE INVENTION

1. Field of the Invention

The present invention relates to a gas adsorbing element and a method of manufacturing the gas adsorbing element. More particularly, the present invention relates to an element for adsorbing an active gas from an inert gas so that only ultra-low concentrations of the active gas remain in the inert gas after processing.

2. Description of the Related Art

In cross-referenced U.S. patent application having Ser. No. 852,291, a method for manufacturing a humidity exchanger element or total heat energy exchanger element is disclosed. The element includes a silicate aerogel having a matrix of inorganic fiber papers. Low density papers of inorganic fibers, such as ceramic fibers, are laminated together in the shape of a humidity exchanger element or total heat energy exchanger element having many small channels. The laminate is impregnated with a water glass solution either before or after the matrix forming process. The laminate is then soaked in a water solution of aluminum salts, magnesium salts or calcium salts to produce silicate hydrogel. This element is then washed with water and dried to obtain the final product.

Japanese patent publication No. 19548/1979 (laid open to the public without examination) discloses a regeneratable dehumidifying rotor. The rotor is made of asbestos papers containing synthesized zeolite. The papers are formed into an element containing numerous small channels. Another regeneratable dehumidifying rotor is made of metal sheets, papers, or non-woven fabric sheets formed into an element having numerous small channels. The sheets or papers carry synthesized zeolite on their surface as a desiccant.

Japanese patent publications Nos. 62598/1985 and 246000/1985 (laid open to public without examination) disclose a method of adhering and combining synthesized zeolite as a desiccant to the surface of the metal or fabric sheets, etc., by using silica gel.

Silica gel used as an adhering and combining agent, as described above, has minimal desiccative properties. Accordingly, the greater the volume of silica gel or other inorganic binders used, the lower the dehumidifying ability per unit weight of the dehumidifying element. When the volume of the binder decreases, the physical strength of the dehumidifying element also decreases and the element cannot be used.

Feed air having a normal temperature and desorbing air having a high temperature pass through the small channel of the element. Adsorbent powder such as silica gel, or synthesized zeolite, on the papers forming the small channels drops off and scatters due to repeated wind pressure and heating and cooling by the feed air and the desorbing air.

Synthesized zeolite does have excellent properties for adsorbing humidity and other active gases from inert gases such as air. This is especially true for synthesized zeolite having small diameter pores adhered to an element matrix. One option is to form paper by mixing synthesized zeolite. However, this is expensive the yield is 50% of less, and the synthesized zeolite on the paper has low adhering properties. Synthesized zeolite also cannot be effectively regenerated. That is, the adsorbed humidity cannot be removed fully from the element without high temperatures being applied. Thus, regeneration of the element is impractical unless temperatures are higher than 140° C.

SUMMARY OF THE INVENTION

Accordingly, it is an object of the present invention to provide an element for obtaining inert gases having ultra-low concentrations of active gases.

A further object of the present invention is to provide a method for manufacturing such a gas adsorbing element.

Yet another object of the present invention is to provide a method for utilizing synthesized zeolite in an adsorbing element so that the above-mentioned drawbacks present no problem.

According to the present invention an element for adsorbing a gas having sufficient physical strength is obtained by using synthesized zeolite powder dispersed in an aqueous solution of water glass. Low density papers are laminated to form a matrix having numerous small channels penetrating therethrough. The matrix is impregnated with a solution containing the synthesized zeolite powder dispersed in the aqueous solution of water glass. The impregnated matrix is dried and then soaked in an aqueous solution of metal salts, for example, aluminum salts, magnesium salts, calcium salts or other appropriate metal salts. The water glass reacts with the metal salts to produce a strong hydrogel in which metal silicate and the synthesized zeolite are uniformly dispersed. The matrix is then washed with water and dried, thus adhering the synthesized zeolite and the metal silicate aerogel to the nucleus of the matrix. This finished element has very high gas adsorbing abilities.

These and other objects and advantages of the invention will become more apparent from the following descriptions, reference being had to the accompanying drawings wherein like reference numerals designate the same or similar parts throughout.

DETAILED DESCRIPTION OF THE PREFERRED EMBODIMENTS

In the present invention, an element for adsorbing an ultra-low concentration gas with sufficient physical strength has been obtained by using synthesized zeolite powder dispersed in an aqueous solution of water glass. The present invention utilizes paper formed in a honeycomb shape as the matrix for holding the gas adsorbing agents. The paper must have the ability to resist both the process gas and the active gases to be adsorbed and removed from the process gas and must be able to be formed in the honeycomb shape. When the finished element is to be heated during a regenerating process (e.g., a dehumidifying process), the paper should be an inflammable inorganic fiber paper, such as paper consisting mainly of ceramic fiber, rock fiber, slag fiber, glass fiber, carbon fiber or mixtures thereof. Asbestos fiber is also inflammable and inorganic, and has in the past been used to form papers for dehumidifying, gas adsorbing or gas absorbing elements. However, the health risks associated with asbestos are well known and documented, and thus asbestos should not be used. When the finished element is to be used by low temperature regeneration or when heating is not necessary for regeneration, organic fiber paper can be used.

In using synthesized zeolite, certain problems must be avoided. Synthesized zeolite is stable only when the pH level is between 5 and 12. When synthesized zeolite contacts either strongly acidic or alkaline liquids, the synthesized zeolite decomposes and its gas adsorbing ability is greatly diminished. Accordingly, any water glass which is very alkaline cannot be used to mix with synthesized zeolite or as an adhesive for laminating papers to form the matrix. Instead, neutral adhesives must be used, such as an emulsion of polyvinyl acetate either alone or in combination with inorganic adhesives.

Figures 1, 2, 3:
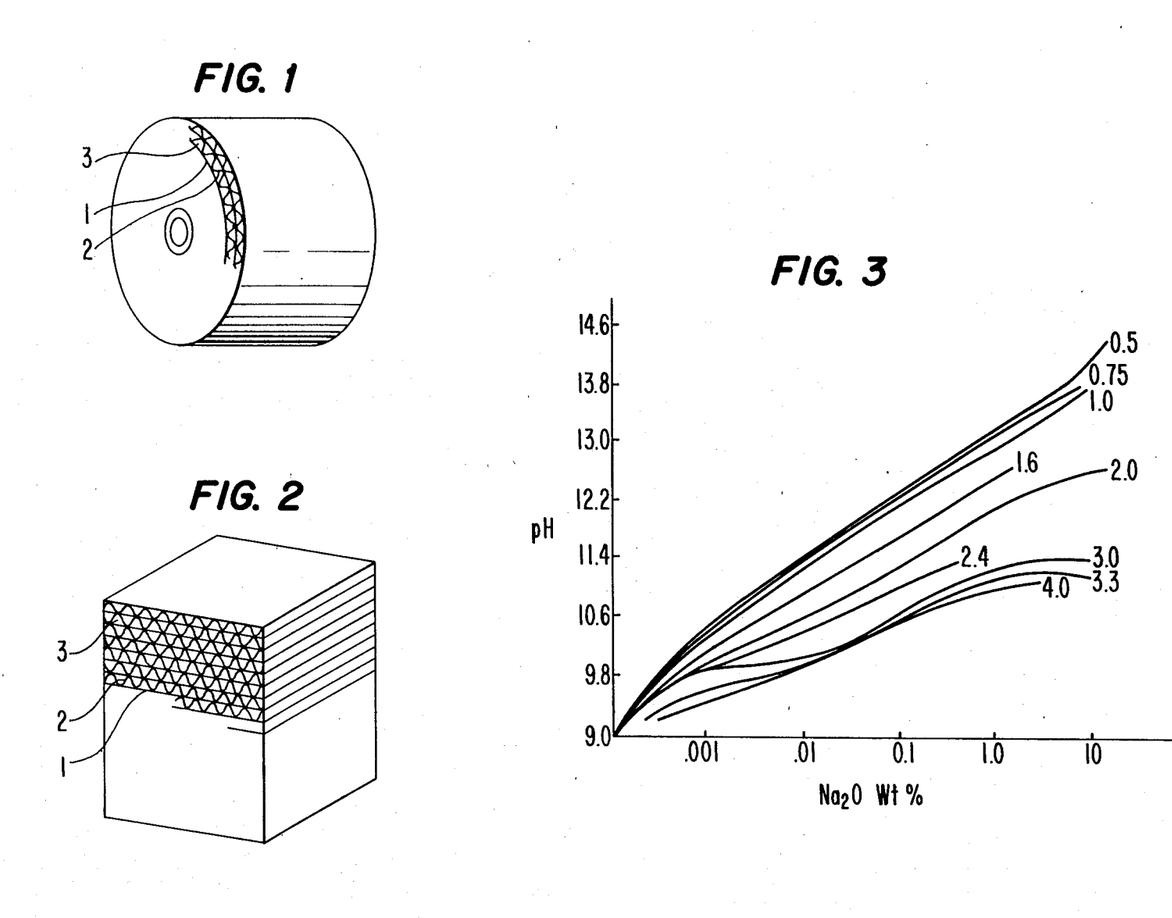
FIGS. 1 and 2 are perspective views of embodiments of an adsorbing element according to the present invention.
FIG. 3 is a graph of the pH levels of various aqueous solutions of water glass and their respective weight ratios.

In dispersing synthesized zeolite powder into an aqueous solution of water glass, the pH level of the aqueous solution of water glass must be considered. FIG. 3 shows the plot of nine curves having a weight ratio of $SiO_2/Na_2O$ for various water glass. The abscissa shows the concentration of water glass by weight % of $Na_2O$. A curve showing the relationship of the concentration and pH of a No. 1 water glass (not shown on the graph) falls between the curve 2.0 and the curve 2.4 ($SiO_2/Na_2O = 2.1$) and cannot be used because when the concentration of $Na_2O$ is more than 1% (by weight), that is, when the concentration of water glass is more than 3% (by weight), its pH becomes more than 12.2.

The concentration and pH of a No. 2 water glass (not shown) would fall between the curve 2.4 and 3.0 ($SiO_2/Na_2O = 2.5$). When $Na_2O$ is 1% (by weight) in the aqueous solution of the No. 2 water glass, that is, when the concentration of water glass is 3.5% (by weight), its pH is less than 12. However, in the drying process before the reaction with metal salt, a water glass which has not yet reacted becomes highly concentrated, or if it is exposed to a high temperature and is highly concentrated at the same time, there is a possibility of the pH surpassing 12.

The concentration and pH of a No. 3 water glass (not shown) would fall between the curve 3.0 and 3.3 ($SiO_2/Na_2O = 3.1$). This water glass can be used with confidence because there is no possibility of the pH surpassing 12 even when $Na_2O$ becomes 10% (by weight). That is, when the concentration of water glass becomes 41% (by weight) the pH would remain less than 12.

Various metal salts react with water glass to produce silicate gel. In principle, any water soluble metal salt can be used that can be obtained at a reasonable price and that can produce, in a reaction with water glass, a gas adsorbing silicate gel which is insoluble in water. On the other hand, the pH of the aqueous solution, especially after producing silicate gel in the reaction with water glass, should have a pH in the range between 5 to 12.

The following table shows the weight of the adsorbed humidity per unit weight of the element (%). The elements were obtained by reacting a water glass solution without synthesized zeolite with aqueous solutions of various metal salts to produce silicate gel. The relative humidity was 75%, and the pH of the aqueous solutions was obtained at a temperature of 21° C. after the reaction.

TABLE 1

| metal salt | metal salt concentration (%) | weight of absorbed humidity (%) | pH |
| --- | --- | --- | --- |
| aluminum sulphate | 20 | 37.6 | 3.02 |
| monobasic aluminum phosphate ($Al(H_2PO_4)_3$) (aluminum tris (dihydrogenphosphate)) | 20 | 30.1 | 1.17 |
| aluminum nitrate | 20 | 23.7 | 1.30 |
| magnesium sulphate | 20 | 23.5 | 8.10 |
| magnesium chloride | 20 | 18.7 | 4.06 |
| aluminum chloride | 20 | 17.2 | 0.92 |
| calcium nitrate | 20 | 13.9 | 10.58 |
| calcium chloride | 20 | 13.0 | 9.2 |

As shown in Table 1 above, among 8 kinds of metal salts, the pH of the aqueous solutions of all the aluminum salts and magnesium chloride was less than 5. Therefore, examples using magnesium sulphate will be disclosed below.

EXAMPLE 1

In a first embodiment, a small quantity of an organic synthetic fiber is added to a ceramic fiber from the silica-alumina group to prepare low density paper having an apparent specific gravity of approximately 0.3–0.45 and having a thickness of approximately 0.15–0.25 mm. Using an adhesive composed of a mixture of synthetic resin, such as polyvinyl acetate, and an inorganic binder, flat paper 1 and corrugated paper 2 are alternately adhered and laminated in a honeycomb, as shown in FIGS. 1 and 2. The formed paper honeycomb is then heated at approximately 400° C. for removing the organic materials, such as the organic fibers and binders, which are contained in the paper. The heating process also removes the polyvinyl acetate contained in the adhesive, to obtain a matrix in the form of a gas adsorbing element with numerous small channels 3 penetrating through to opposite surfaces. The previously described No. 3 water glass is diluted with water, and synthesized zeolite, for example, "Zeolam A-4", produced by Toyo Soda Co., Ltd., is added and the solution is uniformly mixed. The above-mentioned matrix is soaked in the solution and then heated until dry. The matrix is then soaked in a 20% aqueous solution of magnesium sulphate for 3–4 hours to change the sodium silicate of the water glass into a hydrogel of magnesium silicate. By washing the matrix with water and heating until dry, an element for adsorbing ultra-low concentration gases is obtained. The nucleus of the inorganic fiber paper matrix includes synthesized zeolite and an aerogel of magnesium silicate formed and combined on the matrix (for example, having the shapes shown in FIGS. 1 and 2) with the magnesium silicate also acting as a binder.

EXAMPLE 2

Figures 4A, 4B, 4C, 5:
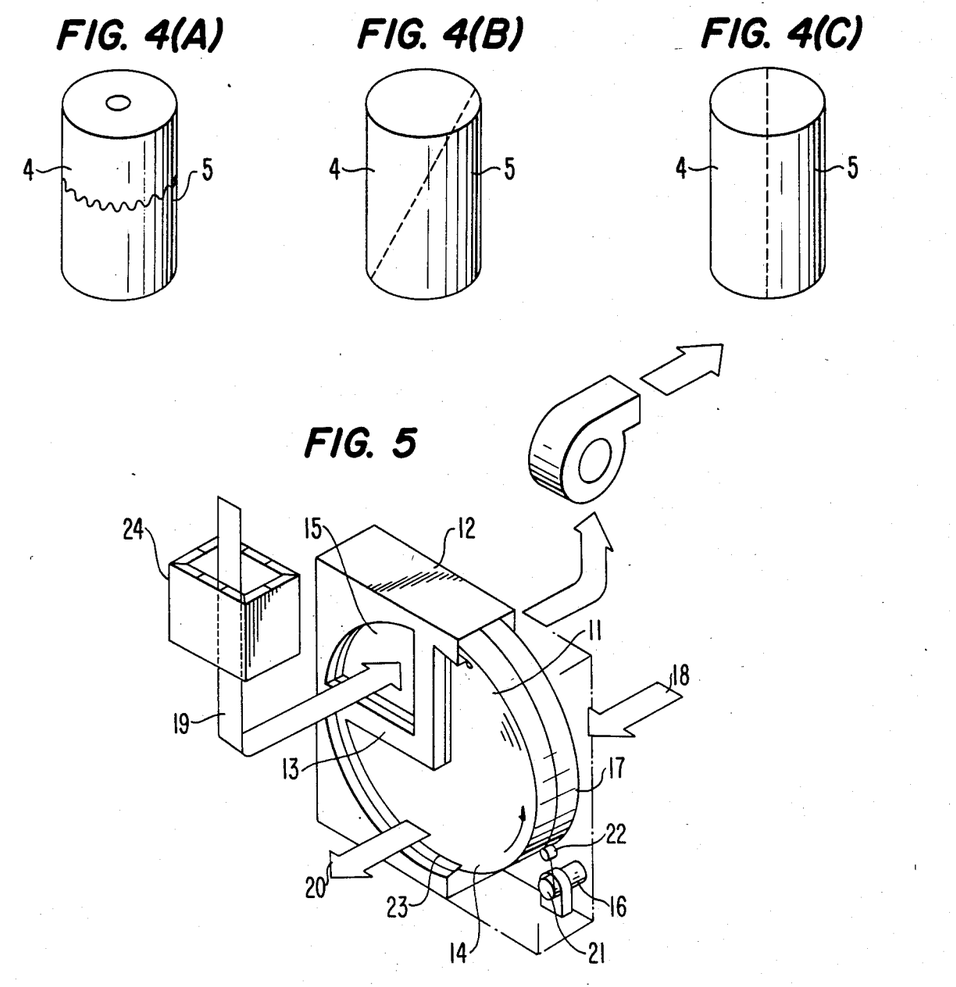
FIGS. 4A–4C are perspective views of a second embodiment of an adsorbing element according to the present invention.
FIG. 5 is a diagram of a rotary type dehumidifier.

In the same manner as explained above in Example 1, a No. 3 water glass is diluted with water, and "Zeolam A-4" is uniformly mixed with the water glass to obtain a first soaking liquid. Contrary to Example 1, the No. 3 water glass is also diluted with water to prepare a second soaking liquid. Further, in the same manner as explained above in Example 1, a matrix in the form of a gas adsorbing element with numerous small channels is prepared by laminating low-density papers of ceramic fiber. As shown in FIGS. 4(A)–4(C), a first part 4 of the matrix is soaked in the first soaking liquid, and a second part 5 of the matrix is soaked in the second soaking liquid. Then the matrix is heated to dry. Thereafter the matrix is soaked in a 20% aqueous solution of magnesium sulphate for 3–4 hours to change the sodium silicate of the water glass into a hydrogel of magnesium silicate. By heating to dry, an element for adsorbing active gases to obtain an ultra-low concentration of gas is formed. The first part 4 of the element comprises layers of the mixture of synthesized zeolite and an aerogel of magnesium silicate, and the second part 5 of the element comprises layers of aerogel of magnesium silicate. The layers of both the first and second parts 4 and 5 are reinforced by the nucleus of the inorganic fiber paper matrix.

The thus-formed element of the present invention for adsorbing active gases to obtain an ultra-low concentration of gases can be used, for example, in a dehumidifier for dehumidifying an inert gas such as air. FIG. 5 is an example of a rotary-type dehumidifier. A gas adsorbing element 11 is held rotatably in a casing 12 which is divided into a dehumidifying zone 14 and a regenerating zone 15 by a separator 13. Element 21 is a pulley, element 22 is a tension pulley, element 23 is a rubber seal, and element 24 is a heater for heating regeneration air 19. The element 11 is rotated at a low speed, approximately 5–20 r.p.h., by a geared motor 16 and a driving belt 17. Process air or feed air 18 is sent into the dehumidifying zone 14 and hot and less humid regeneration air 19 is sent into the regenerating zone 15. The process air 18 is dehumidified to obtain air 20 having an ultra-low dew point.

TABLE 2

| Compound | Synthesized Zeolite | Water glass | | Water | Aqueous solution of metal salts | |
| --- | --- | --- | --- | --- | --- | --- |
| No. 1 | 60 g | No. 3 | 50 g | 80 g | MgSO$_4$ | 20% |
| No. 2 | 60 g | No. 3 | 50 g | 80 g | CaCl$_2$ | 11% |
| No. 3 | 60 g | No. 3 | 90 g | 100 g | MgSO$_4$ | 20% |
| No. 4 | 70 g | No. 3 | 100 g | 110 g | Al$_2$(SO$_4$)$_3$ | 25% |
| No. 5 | — | No. 1 | 70 g | 80 g | Al$_2$(SO$_4$)$_3$ | 25% |
| No. 6 | — | No. 1 | 70 g | 80 g | MgSO$_4$ | 20% |

Figure 6:
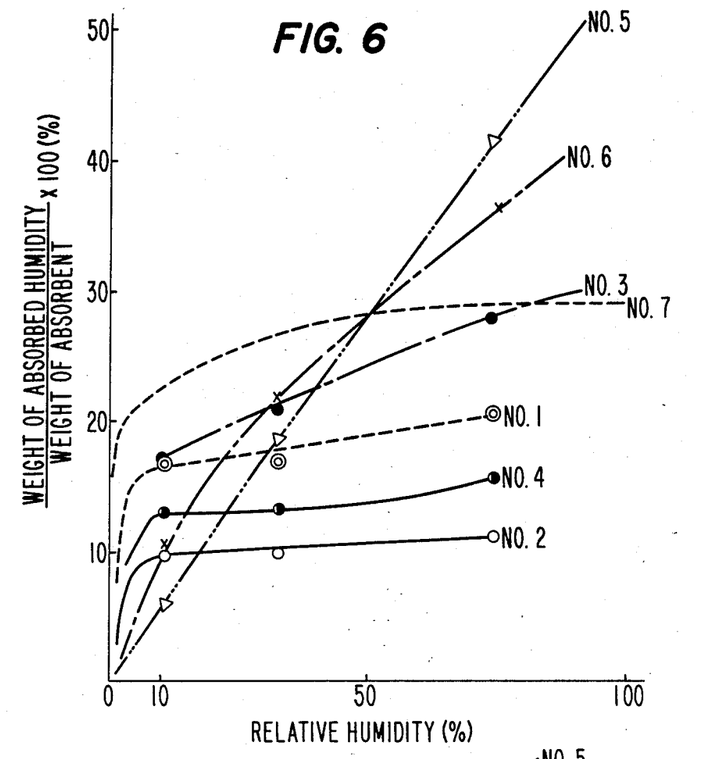
FIGS. 6–10, 12 and 13 are graphs of the dehumidifying abilities of the embodiments of the present invention compared to those of the prior art.

Compound numbers 1–6 in Table 2 were manufactured in the same way previously described in Example 1, except the metal salts specified in Table 2 are used for each respective compound. FIG. 6 shows the equilibrium humidity adsorption weights per unit weight (%) of the compounds in Table 2. Compounds 1–4 are uniform mixtures of synthesized zeolite and metal silicate aerogel, separately taken out of the gas adsorbing elements manufactured in accordance with Example 1, but using materials and amounts specified in Table 2. Compound Nos. 1–4 are compounds according to the present invention, while compound Nos. 5–6 are compounds described in cross-referenced U.S. application having Ser. No. 852,291. In FIG. 6, the curve labelled No. 7 indicates data pertaining to the humidity adsorption weight of the synthesized zeolite "Zeolite X" (disclosed on p. 12 of Japanese Patent Publication No. 6712/1957) produced by Union Carbide & Carbon Corporation (see column 13 of U.S. Pat. No. 2,882,244 to Robert M. Milton, assigned to Union Carbide Corporation).

Figure 7:
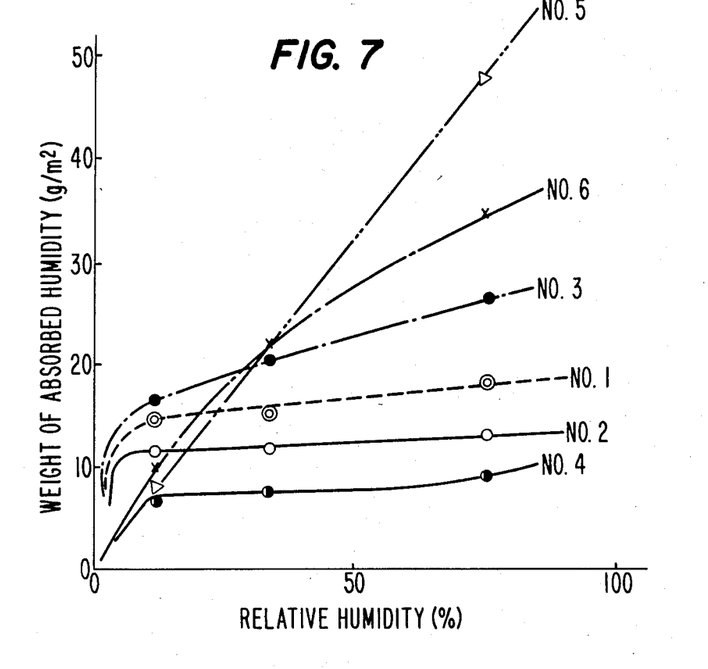

FIG. 7 shows the equilibrium humidity adsorption weights per unit surface area of the sheets (g/m$^2$) which consists mainly of adsorbent materials and amounts given with respect to compound Nos. 1–6 in Table 2.

Figure 8:
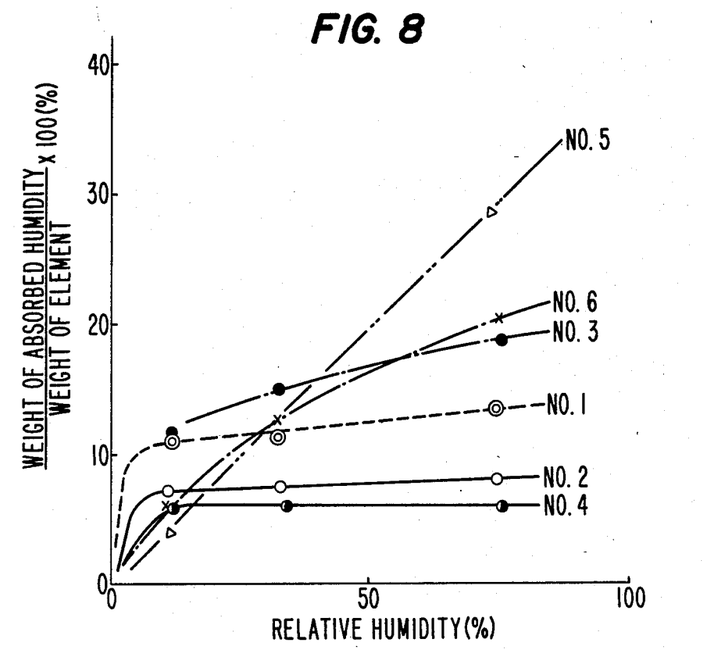

FIG. 8 is a graph of the equilibrium humidity adsorption weights per unit weight (%) of the gas adsorbing elements using the compound Nos. 1–6 in Table 2.

Figure 9:
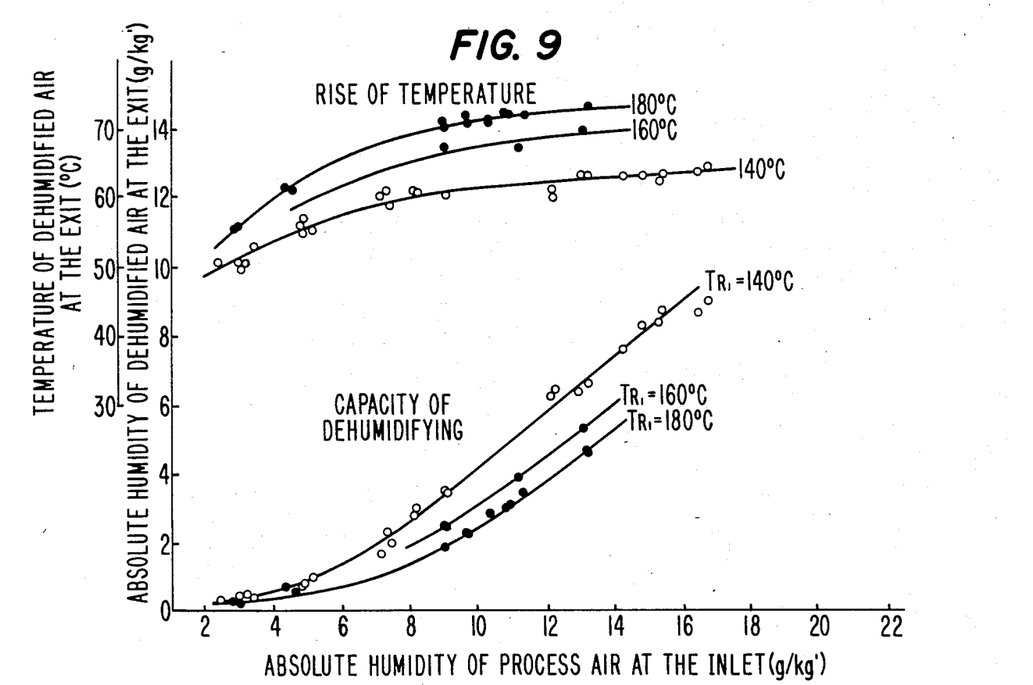

FIG. 9 is a graph of dehumidified air data. That is, the absolute humidity and the temperature of dehumidified air at the exit of the dehumidifier shown in FIG. 5 constructed with a gas adsorbing element using the flat sheets 1 and the corrugated sheets 2 having a thickness of 0.2 mm. The corrugated sheet 2 having a 3.4 mm wave length and a 1.73 mm wave height, and the width of the element, that is the length of the small channels 3, being 200 mm. The No. 3 compound from Table 2 is used in the element, and the rotation speed of the element is 16 r.p.h.. The wind speed of the process air 18 at the inlet is 2 m/sec, the volume ratio of the regeneration air 19 to process air 18 is 1 to 3 ($\frac{1}{3}$), and the temperature of the process air 18 at the inlet is 30° C. Temperatures of the regeneration air 19 at the inlet of 140° C., 160° C. and 180° C. are illustrated. The absolute humidity of regeneration air 19 at the inlet is the same as that of process air 18 at the inlet.

Figure 10:
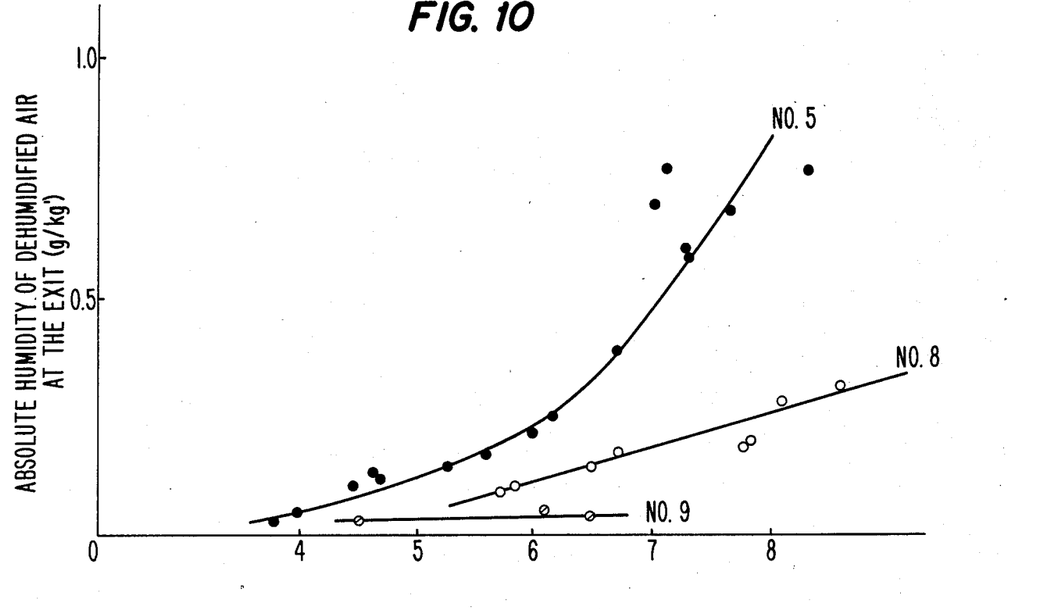
Figure 11:
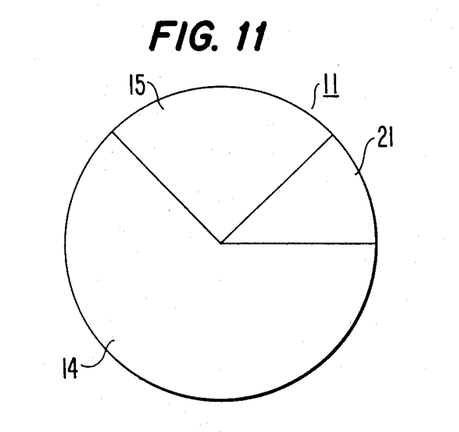
FIG. 11 is a third embodiment of an adsorbing element according to the present invention.

FIG. 10 is according to Example 2, and is a graph of the dehumidified air data showing the absolute humidity of treated air 20 at the exit (g/kg') of the rotary type dehumidifier similar to the device shown in FIG. 5, but divided into the various zones shown in FIG. 11. That is, the element 11 has a treating zone 14 having an angle of 225°, a regeneration zone 15 having an angle of 90° and a purge zone 25. The purge zone 25 is a cooling zone having an angle of 45°. Element No. 8 and No. 9 are manufactured the same as the compound Nos. 3 and 5 set forth in Table 2. Element No. 5 in FIG. 10 is manufactured the same as the compound No. 5 set forth in Table 2. Parts 4 and 5 (FIG. 4(A)) have a width of 400 mm e.g., part 4 has a width of 200 mm and part 5 has a width of 200 mm. The rest of the conditions are the same for all three elements No. 5, 8 and 9. That is, the sheets 1 and 2 are 0.2 mm thick, the corrugated sheet has a 3.4 mm wave length and a 1.73 mm wave length. The data was obtained under the conditions in which the temperature of process air 18 at the inlet for the No. 8 and No. 5 elements is 30° C., and for the No. 9 element is 20° C. The rotation speed of the element is 5 r.p.h., the wind speed at the inlet is 1.5 m/sec., the volume ratio of regeneration air 19 to treating air is 2 to 5 (2/5), the temperature of regeneration air 19 at the inlet is 140° C., and the absolute humidity of regeneration air 19 at the inlet is the same as that of the process air 18 at the inlet.

Figure 12:
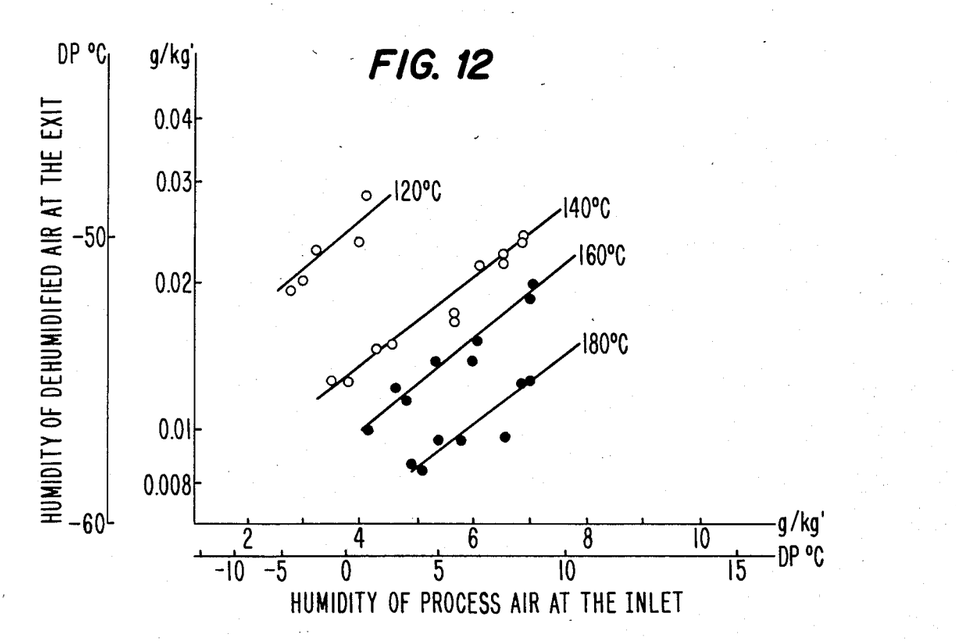

FIG. 12 is a graph of dehumidified air data showing the absolute humidity (g/kg') and the dew point temperature (° C. DP) of the treated air 20 at the exit. The air is dehumidified by the rotary type dehumidifier shown in FIG. 11 with conditions similar to those in FIG. 10 with respect to element No. 8 manufactured according to Example 2. The conditions include that rotation speed of the element is 16 r.p.h., the wind speed at the inlet is 1.45 m/sec., the volume ratio of regeneration air 19 to process air 18 is 2 to 5 (2/5), the temperatures of regeneration air 19 at the inlet of 120° C., 140° C., 160° C. and 180° C., and the humidity of regeneration air 19 in all cases being 8.5 g/kg'.

Figure 13:
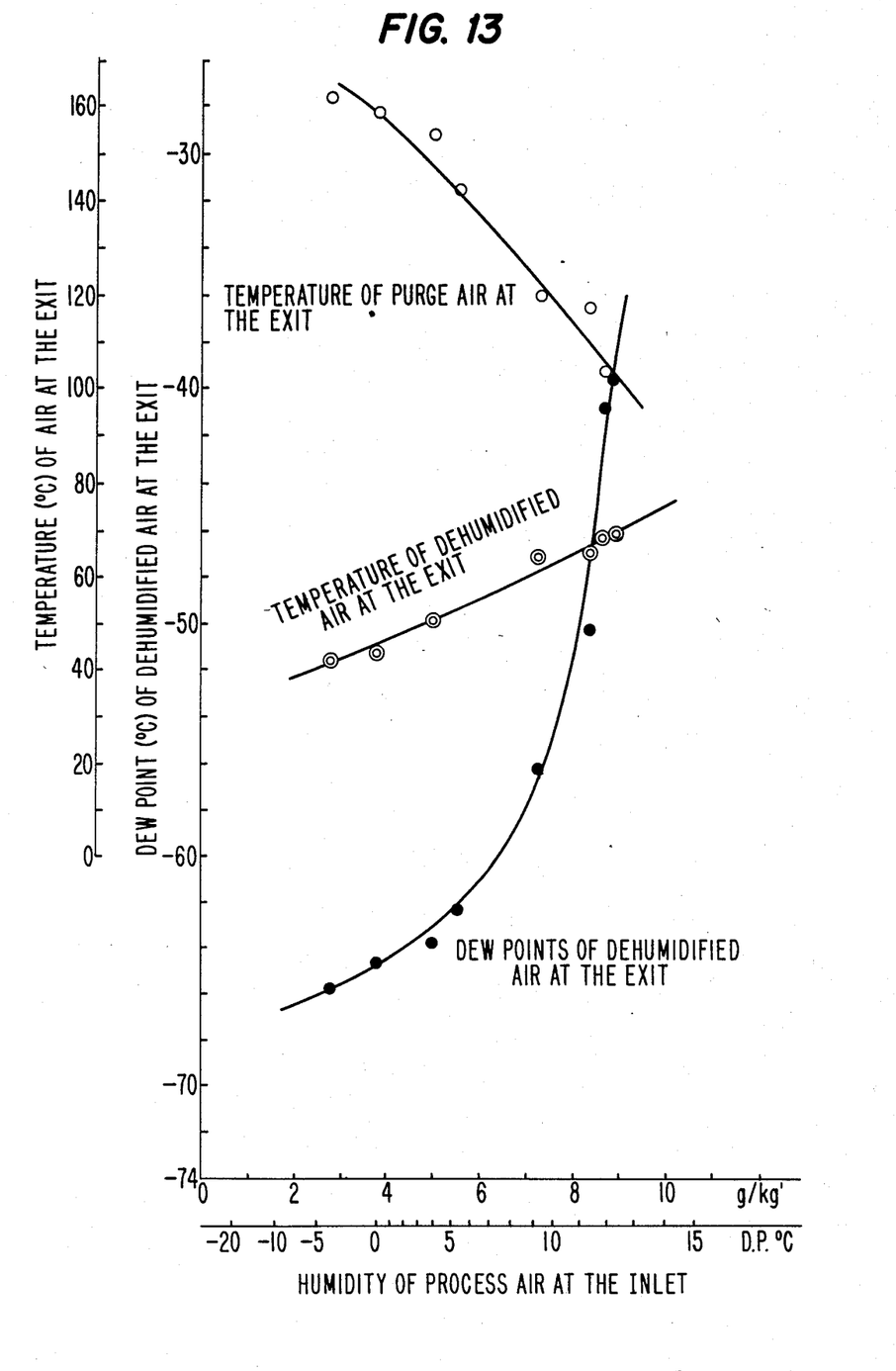

FIG. 13 is a graph of dehumidified air data, i.e., the temperature (° C.) and the dew point temperature (° C. DP) of the treated air 20 at the exit and the temperature of purge air at the exit, from the rotary type dehumidifier shown in FIG. 11, under the following conditions. The width of the element is 400 mm, the element used is element No. 1 shown in Table 2, the sheets have a thickness of 0.2 mm, and the corrugated sheet has a wavelength of 3.4 mm and a wave height of 1.73 mm. The temperature of the process air 18 at the inlet is approximately 18.7 to 21.3° C. The gas adsorbing element 11 rotates at a speed of 8. r.p.h., and the wind speed of air at the inlet is 2 m/sec. In addition, the volume ratio of regeneration air 19 to processing air 18 (at the inlet) is 2 to 5 (2/5). Purge air is present in a part of the dehumidified air 20 and the temperature of regeneration air 19 at the inlet is 180° C. with an absolute humidity of regeneration air 19 at the inlet being the same as that of process air 18 at the inlet.

All of the above data are with respect to examples of heating regeneration. In this case inorganic fiber paper is used and all of the organic materials such as organic fiber, organic binders and organic adhesives contained in papers or in the element should be removed by heating and firing. In a case of a pressure-swing method, for example, in which no heating regeneration is necessary, the removal of organic materials by firing is not necessary and paper containing large amounts of organic fiber can be used.

As is clear from the data in FIGS. 6–10, 12 and 13, the honeycomb structured gas adsorbing element of the present invention, formed of sheets consisting mainly of a uniform mixture of synthesized zeolite and chemically synthesized metal silicate aerogel (the metal silicate aerogel being synthesized in the presence of a synthesized zeolite) is more efficient compared with the honeycomb structured dehumidifier element of the cross referenced application, which is formed with sheets consisting mainly of only metal silicate aerogel.

As shown in FIGS. 6-8, among the data regarding dehumidified air, when aluminum salts are used, it seems that their adsorbing ability is not fully appreciated because the aqueous solution of aluminum salts is acidic and therefore the synthesized zeolite is decomposed. When calcium chloride is used, it seems that its adsorbing ability is not fully appreciated because the activity of produced calcium silicate aerogel is low. Among aluminum salts, magnesium salts and calcium salts, magnesium salts give the best results. On the other hand, the above-mentioned metals may be substituted for sodium of synthesized zeolite $xNa_2O.yAl_2O_3.zSiO_2.nH_2O$ by processing the synthesized zeolite with the aqueous solution of metal salts, without a decrease in dehumidifying ability.

As mentioned above, a synthesized zeolite can exhibit an excellent humidity adsorbing abilities when the diameter of the small parts is properly selected to obtain an ultra-low dew point of the inert gas. In dehumidifying air of very high humidity, metal silicate aerogel is better. Metal silicate aerogel can be sufficiently desorbed and regenerated by regeneration air having a temperature of approximately 140° C., but synthesized zeolite needs higher temperatures of approximately 180° to 200° C. desorption and regeneration. Therefore, when the element of the present invention is used to adsorb an ultra-low concentration gas for dehumidifying an inert gas with heating regeneration, it may be advantageous to first dehumidify the inert gas to a relative humidify of 25 to 30% by a dehumidifier using a prior dehumidifier element, for example, that taught in cross-referenced U.S. Ser. No. 852,291, and then further dehumidify the inert gas by the dehumidifier element of the present invention to obtain an ultra-low dew point inert gas such as air.

The gas adsorbing element described in Example 2 completely carries out this two-stage dehumidifying process using one element, i.e., one dehumidifier. Process air 18 is sent in from the edge surface of part 5 of the element in FIG. 4, that is, the treating zone including metal silicate aerogel, and is substantially dehumidified in part 5. Then it is further dehumidified in part 4 by synthesized zeolite and metal silicate aerogel to obtain air having an ultra-low dew point as shown by the data in FIGS. 10, 12 and 13. On the other hand, from the edge of part 4, that is, the regeneration zone of the mixed synthesized zeolite and metal silicate aerogel of the present invention, regeneration air, having a temperature of approximately 160°–180° C. is sent to part 4 containing the synthesized zeolite. Then with the regeneration air, whose temperature has been somewhat decreased, for example, to approximately 140° C., part 5, including only metal silicate aerogel, is regenerated. In this way, the heat energy of regeneration air can be effectively utilized. In FIG. 4, the ratio of the lengths of part 4 and part 5, and other conditions, can be arranged and changed in various ways as shown, for example, in FIG. 4 (B) and FIG. 4 (C), according to the desired end use. In Example 1, the ratio of synthesized zeolite and metal silicate aerogel can of course be arranged and changed in various ranges. In part 4 and part 5 in Example 2, similar arrangements can be performed, for example, by allowing part 5 to contain a small amount of synthesized zeolite.

It is also possible to manufacture two sections of the gas adsorbing element of Example 2 having the same size. That is, an element to obtain an ultra-low concentration gas (part 4) of the present invention, and the dehumidifier element (part 5) taught by cross referenced U.S. Ser. No. 852,291, and to join the two parts together into one dehumidifier to carry out a dehumidifying process similar to the above.

In the above-mentioned examples, "Zeolam A-R" (referred to as 4A type synthesized zeolite having small channels approximately 4 A in diameter and which has an empirical formula of $1.0\pm0.2Na_2O.Al_2O_3.1.85\pm0.5 SiO_2. yH_2O$), was used for dehumidifying air. It can, as well as a 3A type synthesized zeolite having small channels having a diameter of approximately 3Å, also be used for, other than dehumidifying, adsorption and removal of ammonia, methanol, and so on. Moreover for gas adsorption, paper containing a third adsorbent such as active carbon fiber can be used.

Thus, according to the present invention, a honeycomb-shaped gas adsorbing element having a high physical strength can be obtained. The gas adsorbing element includes a matrix of low density paper and metal silicate aerogel produced by a chemical reaction in the gaps of fibers of and on the surface of the paper for performing a gas adsorbing activity. The metal silicate aerogel is uniformly mixed with the synthesized zeolite. Fibers contained in the element (about 15% of the weight of the element) work to increase resistance of a humidity adsorbing block against a sudden change in temperature and humidity. Moreover, almost all the weight of the humidity adsorbing element (including synthesized zeolite at about 10–70% and metal silicate aerogel at about 15-75%) works effectively as a gas adsorbent. The present invention makes it possible to obtain easily and inexpensively a gas adsorbing element for removing an active gas to an ultra-low concentration in the inert gas by the action of the synthesized zeolite to obtain an inert gas having an ultra-low dew point.

What is claimed:

1. A method of manufacturing an element for adsorbing active gases from an inert gas, comprising:
   (a) laminating low density paper to obtain a matrix element having numerous small channels penetrating through to opposite surfaces;
   (b) soaking the matrix element in an aqueous solution of water glass having synthesized zeolite powder dispersed therein;
   (c) drying the soaked matrix;
   (d) soaking the dried matrix in an aqueous solution of water soluble metal salts to produce a metal silicate hydrogel by the reaction of the water glass and the metal salts;
   (e) washing the twice-soaked matrix element with water; and
   (f) drying the washed matrix element to obtain the gas adsorbing element.

2. A method of manufacturing a gas adsorbing element according to claim 1, wherein the low density paper includes inorganic fiber.

3. A method of manufacturing a gas adsorbing element according to claim 1, wherein the low density paper includes one of carbon fiber and active carbon fiber.

4. A method of manufacturing a gas adsorbing element according to claim 1, wherein said step (d) includes the substep of providing the metal silicate hydrogel insoluble in water by reacting water glass with metal salts selected from the group consisting of aluminum salts, magnesium salts, and calcium salts.

5. A method of manufacturing a gas adsorbing element according to claim 1, wherein the said step (a) includes obtaining the matrix element having first and second portions.

6. A method of manufacturing a gas adsorbing element according to claim 5, wherein said step (a) includes the substeps of:
   (i) forming the first portion of the matrix element by impregnating with the aqueous solution of water glass having synthesized zeolite powder dispersed therein; and
   (ii) forming the second portion of the matrix element by impregnating with the aqueous solution of water glass.

7. A gas adsorbing element for adsorbing the active gas contained in an inactive gas, comprising:
   a plurality of low density paper formed of inorganic fiber laminated to form a matrix;
   small channels formed between the laminated low density papers, the channels extending to opposite surfaces;
   a synthesized zeolite powder applied to the matrix; and
   a metal silicate aerogel formed on the paper and in the apertures between fibers of said low density paper and combining with the synthesized zeolite.

8. A gas adsorbing element according to claim 7, wherein said low density paper substantially includes inorganic fiber.

9. A gas adsorbing element according to claim 7, wherein said low density paper substantially includes one of carbon fiber and active carbon fiber.

10. A gas adsorbing element according to claim 7, wherein said matrix element includes a first part and a second part, said first part including synthesized zeolite and a metal silicate aerogel, and said second part including a metal silicate aerogel.

11. A gas adsorbing element according to claim 10, wherein said metal silicate aerogel is selected from a group consisting of aluminum silicate, magnesium silicate and calcium silicate.

* * * * *

UNITED STATES PATENT AND TRADEMARK OFFICE
CERTIFICATE OF CORRECTION

PATENT NO. : 4,886,769

DATED : DECEMBER 12, 1989

INVENTOR(S) : TOSIMI KUMA ET AL.

It is certified that error appears in the above-identified patent and that said Letters Patent is hereby corrected as shown below:

FRONT PAGE, [57] ABSTRACT, line 3, delete "inert gas such as air containing an".

Col. 6, line 45, "length" should be --height--.

Col. 7, line 57, "parts" should be --pores--.

Col. 8, line 46, "A" should be --Å--.

Signed and Sealed this

Twenty-seventh Day of November, 1990

Attest:

HARRY F. MANBECK, JR.

*Attesting Officer*   *Commissioner of Patents and Trademarks*